United States Patent [19]

Baumgarten

[11] Patent Number: 5,049,362

[45] Date of Patent: Sep. 17, 1991

[54] APPARATUS FOR TREATMENT OF OBJECTS WITH UHF-ENERGY

[75] Inventor: Wilfried Baumgarten, Pattensen, Fed. Rep. of Germany

[73] Assignee: Paul Troester Maschinenfabrik, Hanover, Fed. Rep. of Germany

[21] Appl. No.: 454,743

[22] Filed: Dec. 20, 1989

[30] Foreign Application Priority Data

Dec. 24, 1988 [DE] Fed. Rep. of Germany ....... 3843904

[51] Int. Cl.[5] ........................ B01J 19/08; B01J 19/12; H05B 6/64; H05B 6/78

[52] U.S. Cl. ............................... 422/186.05; 422/186; 422/186.04; 219/10.55 A

[58] Field of Search ....................... 422/186.04, 186.05, 422/186; 219/10.55 A

[56] References Cited

U.S. PATENT DOCUMENTS 4,176,267 11/1979 Rueggeberg ................. 219/10.55 A 4,246,462 1/1981 Meisel .......................... 219/10.55 A 4,492,839 1/1985 Smith ........................... 219/10.55 R 4,687,895 8/1987 Chitre et al. ................. 219/10.55 A

*Primary Examiner*—Brooks H. Hunt

*Assistant Examiner*—Daniel J. Jenkins

*Attorney, Agent, or Firm*—Robert E. Burns; Emmanuel J. Lobato

[57] ABSTRACT

The invention relates to an apparatus for treating objects with UHF-engergy comprising an elongated treating chamber, which is provided with UHF traps at entrance and exit ends, through which a conveyor runs and on its upper side is provided with UHF energy inputs which are connected by waveguides with their energy source, whereby parts of the upper side of the treating chamber are formed as hinged or removable covers. It is the object of the invention to provide an apparatus for treating products with UHF-energy which with simple construction permits an opening of the treating chamber from above over its entire length. The invention consists therein, that also those parts of the upper side of the treatment chamber which are provide with UHF inputs are formed as hinged or removable covers and that the waveguide leading from the UHF energy source to the UHF inputs to the treating chamber is formed flexible or comprise at least two separable parts.

11 Claims, 2 Drawing Sheets

APPARATUS FOR TREATMENT OF OBJECTS WITH UHF-ENERGY

The invention relates to apparatus for treatment of objects with UHF-energy, comprising an elongate treatment chamber of which the entrance and exit are provided with UHF-traps, through which a conveyor device runs and which on its upper and/or lower side is provided with devices for feeding in UHF-energy which are connected by waveguides with the UHF-energy source whereby parts of the upper side of the treatment chamber laterally of the UHF feeding devices are formed as hinged or removable covers.

Such apparatus has been on the market more than 15 years and serves primarily for the vulcanization of rubber mixtures and the polymerization of plastics, which are mostly of strand-form profile. With these treatment sections, parts in which the UHF-energy is fed in and in which the objects to be treated are heated by the UHF-energy alternate with intermediate temperature equalizing sections in which the not always uniform energy fed into the objects to be treated is afforded the possibility of diffusing uniformly in the objects to be treated. The feeding in of the UHF-energy in these treatment chambers is from above or from below because this facilitates the uniform division of the energy and the uniform distribution of the electromagnetic fields. Feeding the energy from the side is not as favorable, in particular for wide objects.

When it happens, although in rare instances, that the objects being treated jam up inside the length of the treatment chamber and because it is also necessary to clean the treatment chamber from time to time, parts of the upper side of the treatment chamber are formed as hinged covers, so that an access to the inside of the treatment chamber is possible. These covers are arranged in the location of the temperature equilization section. However, heretofore no covers are provided where the UHF-energy is fed into the treatment chamber. For in these locations the UHF-energy is fed in through fixed waveguides which must be demounted for an opening of the cover, which entails a considerable expenditure of energy. The lack of good access for cleaning the interior is particularly disadvantageous in these locations, because in these locations the highest temperature of the goods to be treated occurs, with the evaporation of volatile components which are deposited on the inner wall of the treatment chamber and must be removed, because they can cause a fire.

With this apparatus, it is also known to produce the individual parts of the treatment chamber—energy input sections and temperature equalization sections—as like parts and then to assemble them in building-blocks manner to form the treatment section.

In such known apparatus there is produced a UHF-treatment chamber, which as described in DE-OS 26 42 152 is open over its entire length in order to provide access to the objects being treated in the case of jamming and in order to provide for easier cleaning of the UHF-treatment chamber. The treatment chamber is for this purpose given the form of a lying U or C-form. The continuous open side wall is closed through hinged doors for operation. The advantage of this arrangement is that the UHF-energy can be fed in from above and despite this, the treatment chamber can be opened over its entire length. However, the disadvantage lies therein that work in the interior of the treatment chamber is more difficult in that the service person can perform this work only in a bent-over position. For UHF-treatment chambers are arranged at a height of from 60 to 110 cm in order that at the entrance and exit the ingoing and outcoming product is well visible and also the unloading or other manipulation of the product can be carried out by hand. This cleaning work in a bent-over position has been accepted in the trade because it is very important to feed the UHF-energy into the treatment chamber from above. There is also here the danger that the cleaning and control work carried out in an uncomfortable position is not carried out with the necessary care. Moreover, in spite of all security measures, the presence of the escape of stray rays is unfavorable because all stray rays exit to the side on which the service persons are present.

The invention avoids the disadvantages of the state of the art. It is the object of the present invention to provide an installation for the treatment of products with UHF-energy which provides with simple construction, an opening of the treatment chamber from above over the entire length of the treatment chamber.

The invention resides therein that those parts of the upper side of the treatment chamber which are provided with inputs for UHF-energy are formed as hinged or removable covers and that the waveguide leading from the UHF-energy source to the UHF-input devices is formed flexible or at least of two parts which are detachable from one another.

With this construction of the apparatus, it is possible to open the entire treatment chamber from above whereby maintenance and cleaning work is made very easy. For the service person can now carry out this work without being in a bent-over position or being hindered in the cleaning and control through treatment chamber parts which are closed on all sides. Also stray rays can escape only through a sealed slit on the side opposite the service persons.

There are several advantageous designs possible.

One advantageous design is that the flexible construction of the waveguides is realized through a joint in the waveguide aligned with the axis of the cover hinge whereby the two joined waveguide parts are surrounded at the location of the joint by a trap for UHF-energy.

With this design, it is desirable when the two waveguide parts in the location of the joint are coaxial with the axis of the cover hinges and at the joint position are provided with abutting flanges. A design of this kind can be easily realized. It is advantageous in that at the joint position no UHF-energy is lost.

Another design consists in that the joint in the waveguide is formed through two waveguide parts which are of circular cross section and are telescoped into one another, advantageously with the same internal cross section. The two waveguide parts overlap one another in the joint position advantageously by $\frac{1}{4}$ of the wavelength.

The same advantages are provided by another design in which the two waveguides at the joint location are arranged overlapping adjacent one another and have on the sides facing one another an opening which is surrounded by a mechanical, ring-form joint.

In a basically different embodiment, the technical advantage is achieved that the flexible construction of the waveguide is realized through the use of a flexible metal tube.

In order for the treatment chamber in operation to be fully microwave tight, it is advantageous when at least one cover part on at least one side is provided with a microwave trap which overlaps an adjacent cover part or an end part of the treatment chamber.

For many applications, it is advantageous when the treatment chamber has a single cover overlapping a UHF in-feeding position as well as a temperature equalizing section.

Moreover, it is advantageous on construction grounds when each magnetron is provided with at least one branching to different in-feeding positions and when the positions fed from one magnetron have one cover.

The essence of the present invention is more fully explained with reference to the drawings which schematically illustrate exemplary embodiments.

DESCRIPTION OF PREFERRED EMBODIMENTS

Figures 1, 2, 3:
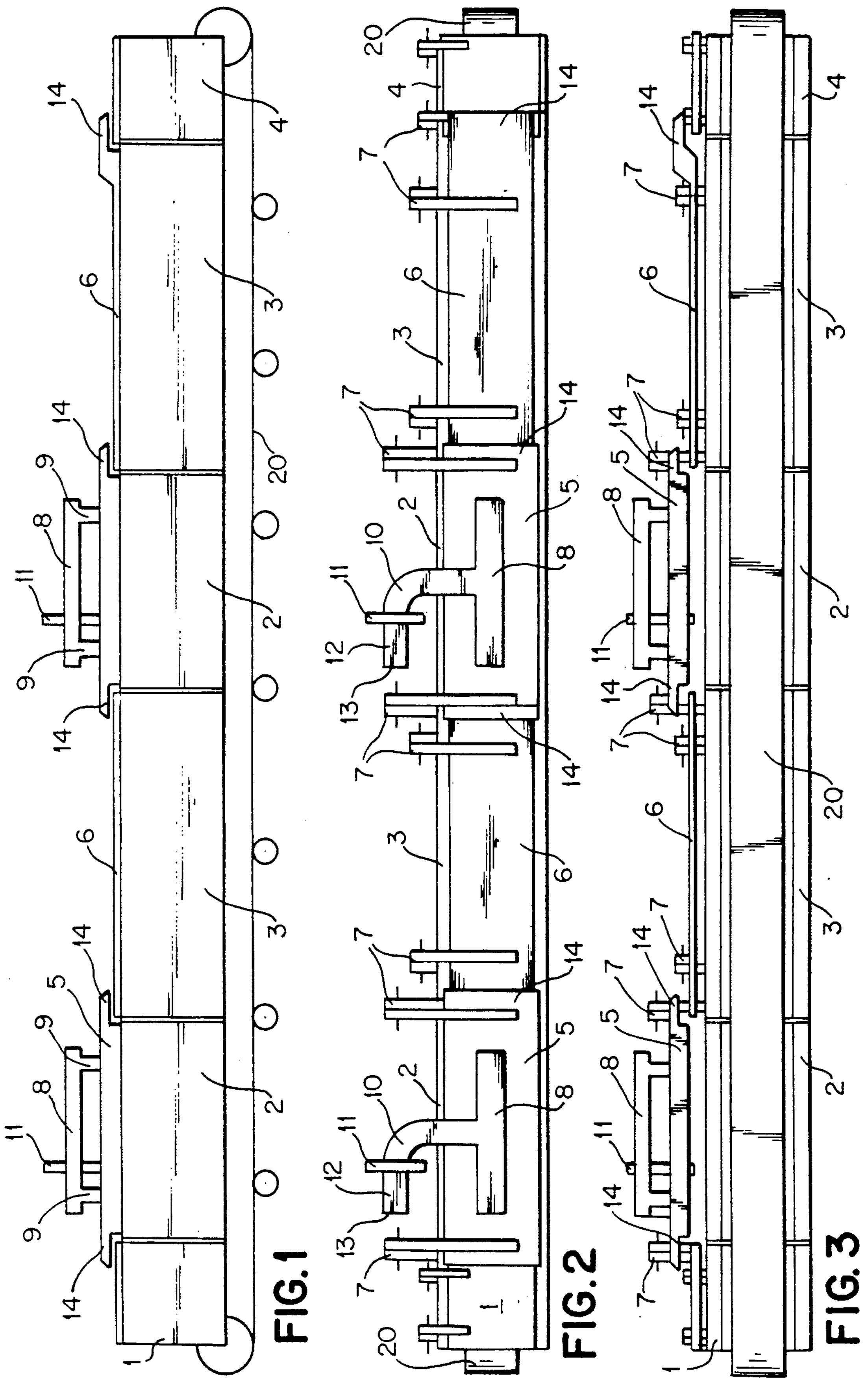
FIG. 1 is a side elevation of the treatment chamber.
FIG. 2 is a plan view of the treatment chamber in closed condition.
FIG. 3 is a plan view of the open treatment chamber.

The elongate treatment chamber is assembled from six parts of which two are formed in like manner. At the entrance of the treatment chamber, there is a UHF trap 1 followed by a treatment section 2 and a temperature equalizing section 3. This is followed by another treatment section 2 followed by a temperature equalizing section 3. These sections forming the treatment chamber terminate in an exit trap 4. Each of these sections is provided with its own cover 5, 6. Each cover is mounted on two hinges 7. The covers 5 of the treatment sections 2 carry a waveguide 8 with two input openings 9 into the interior of the treatment section. Each of the waveguides 8 has an elbow 10 which leads to the joint position 11 which is arranged coaxially with the hinges 7 of the cover. From this joint position, a further waveguide 12 leads to the UHF-energy source 13.

Each of the covers 5 is provided at both sides with a UHF-trap 14 which overlaps the adjacent cover 6 of the temperature equalizing sections 3 or the end sections 1, 4.

Figure 4:
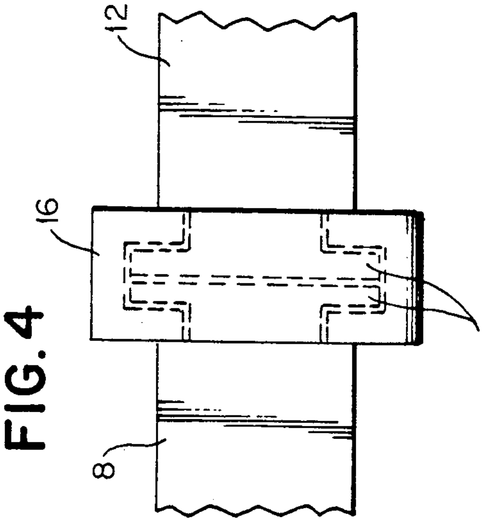
FIG. 4 is an elevation of a waveguide provided with a joint in operative position.
Figure 5:
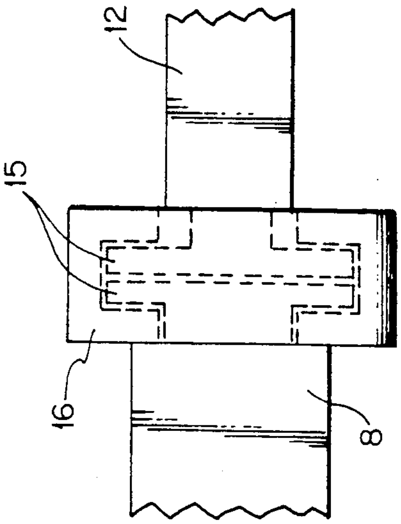
FIG. 5 is an elevation of the waveguide in open position.

The joint in the waveguide can have different forms. In the embodiment shown in FIGS. 4 and 5, the waveguides 8 and 12 of rectangular cross section have at their adjacent ends flanges 15, shown in broken lines, which are surrounded by joint rings 16 each having two inwardly directed flanges. These rings 16 are formed as microwave traps. The waveguides 8 and 12 are rectangular. In closed position their cross sections are aligned with one another, in open position the cross sections are at right angles to one another.

Figure 6:
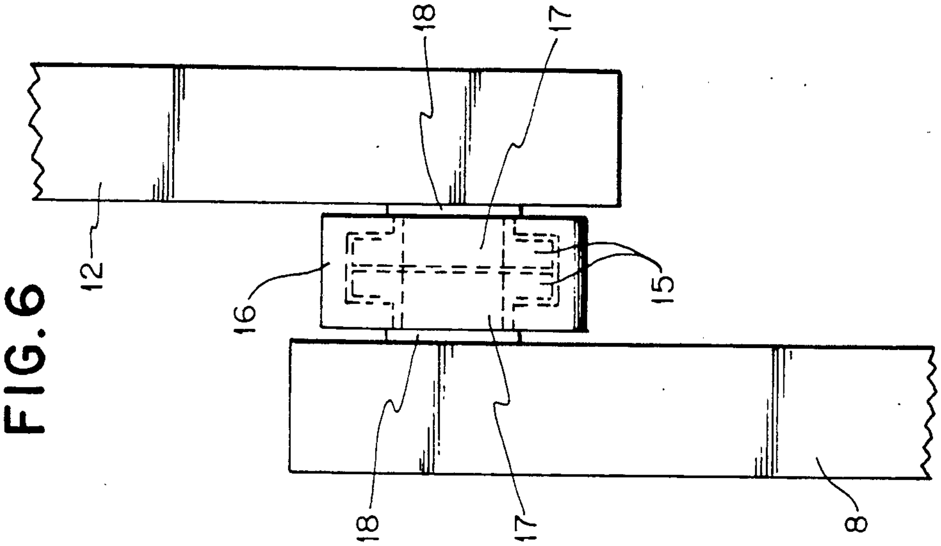
FIG. 6 is another view of the waveguide joint.

In the embodiment shown in FIG. 6, the waveguides 8, 12 have on the sides turned toward one another an opening 17 in which is connected a tube section 18 with a flange 15. The two flanges 15 are surrounded by a joint ring 16 with inwardly directed flanges. This joint ring 16 is formed as a microwave trap.

Figure 7:
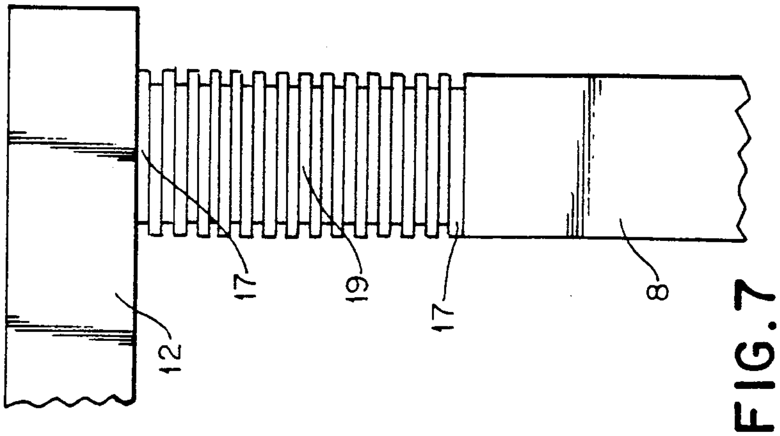
FIG. 7 shows a flexible metal tube connection of two waveguides in the joint position.

In the embodiment illustrated in FIG. 7 the two waveguides 8 and 12 have their openings 17 connected by a flexible metal tube 19.

A conveyor belt 20 runs through the treatment chamber as a conveying device.

Figure 8:
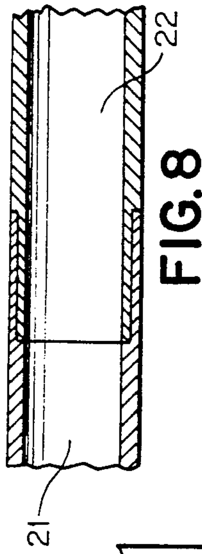
FIG. 8 is a cross section through a joint position, which comprises two waveguide parts telescoped into one another.

In the embodiment illustrated in FIG. 8, two waveguide parts are telescoped into one another. Both parts have the same inner and outer cross sections. Their inner cross sections are identical. The lengths of the overlap of the telescoped waveguide parts amounts to a quarter of the wavelength of the UHF.

What I claim is:

1. Apparatus for treatment of objects with UHF energy, comprising an elongate treatment chamber having a bottom and sides and having an entrance end and an exit end, a conveyor for objects to be treated running through said treatment chamber, said chamber having at least one treatment section followed by a temperature equalizing section, each of said sections having a cover hinged at one side to swing from a closed position to an open position, the cover of said treatment section having at least one UHF-energy input opening and a waveguide connecting said input opening with a UHF-energy source, said waveguide comprising two sections connected to one another by a joint disposed in line with the hinge of the treatment section cover and permitting relative movement of said waveguide sections upon opening of said cover.

2. Apparatus according to claim 1, in which said joint between said sections of said waveguide comprises a UHF-energy trap.

3. Apparatus according to claim 1, in which said joint between said waveguide sections comprises flanges on adjacent ends of said waveguide sections and a collar with spaced inward flanges embracing said flanges on said waveguide sections.

4. Apparatus according to claim 1, in which said waveguide sections have overlapping adjacent end portions with an opening in each of said end portions in the side facing the other waveguide section, said openings being aligned with one another, and in which said joint between said waveguide sections comprises aligned tubular sections set in said openings with a rotary joint between said tubular sections.

5. Apparatus according to claim 4, in which said joint between said tubular sections comprises a flange on each of said tubular sections and an inwardly-flanged collar embracing said flanges on said tubular sections.

6. Apparatus according to claim 1, in which said joint between said waveguide sections comprises telescopically interfitting cylindrical end portions of said waveguide sections.

7. Apparatus according to claim 6, in which said telescopically interfitting cylindrical end portions of said waveguide sections have a length at least approximately equal to one quarter wave length of said UHF energy.

8. Apparatus according to claim 1, in which UHF-energy traps are provided between adjacent covers.

9. Apparatus according to claim 8, in which each of said UHF-energy traps between adjacent covers comprises a flange on one cover overlapping an adjacent cover.

10. Apparatus according to claim 1, in which said elongate treatment chamber, further comprises entrance and exit end portions, each of which comprises means for trapping UHF-energy.

11. Apparatus according to claim 1, in which said elongate treatment chamber comprises at least two of said treatment sections, each of which is followed by a temperature equalization section.

* * * * *